(12) United States Patent
Yoshida et al.

(10) Patent No.: US 9,302,602 B2
(45) Date of Patent: Apr. 5, 2016

(54) VEHICLE SEAT

(71) Applicant: TS TECH CO., LTD., Asaka-shi, Saitama (JP)

(72) Inventors: Hajime Yoshida, Tochigi (JP); Masaru Tsukamoto, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 14/421,026

(22) PCT Filed: Aug. 12, 2013

(86) PCT No.: PCT/JP2013/071818
§ 371 (c)(1),
(2) Date: Feb. 11, 2015

(87) PCT Pub. No.: WO2014/027643
PCT Pub. Date: Feb. 20, 2014

(65) Prior Publication Data
US 2015/0239379 A1   Aug. 27, 2015

(30) Foreign Application Priority Data
Aug. 13, 2012 (JP) .................................. 2012-179636

(51) Int. Cl.
*A47C 7/74* (2006.01)
*A47C 31/02* (2006.01)
(Continued)

(52) U.S. Cl.
CPC .............. *B60N 2/5685* (2013.01); *A47C 7/748* (2013.01); *B60N 2/5816* (2013.01); *B60N 2/5825* (2013.01)

(58) Field of Classification Search
CPC .. B60N 2/5685; B60N 2/5825; B60N 2/5816; A47C 7/748

USPC ........ 297/180.12, 218.1, 218.2, 218.3, 218.4, 297/218.5
See application file for complete search history.

(56) References Cited

U.S. PATENT DOCUMENTS 4,695,091 A * 9/1987 Altmann ................... B60N 2/58
297/180.12 X
4,718,718 A * 1/1988 Maruyama ........... B60N 2/5685
297/180.12

(Continued)

FOREIGN PATENT DOCUMENTS

DE          89 02 260 U1    5/1989
DE        195 25 443 A1    1/1997

(Continued)

OTHER PUBLICATIONS

Extended European Search Report issued for EP 13879658.6 (Aug. 11, 2015).

*Primary Examiner* — Rodney B White
(74) *Attorney, Agent, or Firm* — Drinker Biddle & Reath LLP

(57) ABSTRACT

A seat heater provided in a seat cushion of a vehicle seat includes a first heater wire and a second heater wire which are arranged on the opposite side to each other through the groove provided on the surface of a cushion pad, and a groove portion heater wire provided in the groove for connecting the second heater wire with the first heater wire. The groove portion heater wire includes one end portion extending toward a groove bottom beyond a first corner of the groove, the other end portion extending toward the groove bottom beyond a second corner of the groove, and a folded portion folded in the central part of the groove bottom. The extending direction of at least one of the one end portion and the other end portion of the groove portion heater wire is inclined with respect to the depth direction of the groove.

12 Claims, 12 Drawing Sheets

(51) Int. Cl.
*B60N 2/56* (2006.01)
*B60N 2/58* (2006.01)

(56) References Cited

U.S. PATENT DOCUMENTS

| | | | | |
|---|---|---|---|---|
| 4,865,379 A | * | 9/1989 | Aoki | B60N 2/5685 297/180.12 |
| 4,927,209 A | * | 5/1990 | Maruyama | B60N 2/5825 297/180.12 |
| 6,540,303 B2 | * | 4/2003 | Mosquera | B60N 2/5883 297/180.12 X |
| 6,988,770 B2 | * | 1/2006 | Witchie | A47C 7/744 297/180.12 |
| 7,205,510 B2 | * | 4/2007 | Howick | B60N 2/5685 297/180.12 X |
| 8,099,837 B2 | * | 1/2012 | Santin | A47C 31/023 297/218.2 |
| 8,201,880 B2 | * | 6/2012 | Kato | B60N 2/002 297/180.12 |
| 8,492,680 B2 | * | 7/2013 | Ohashi | B60N 2/5685 297/180.12 X |
| 8,814,262 B2 | * | 8/2014 | Abe | A47C 7/74 297/180.12 X |
| 2008/0258523 A1 | * | 10/2008 | Santin | B60N 2/5825 297/218.2 |
| 2009/0001778 A1 | * | 1/2009 | Nathan | B60N 2/5685 297/180.12 |
| 2009/0095725 A1 | * | 4/2009 | Ohashi | B60N 2/5685 297/180.12 X |
| 2009/0146470 A1 | * | 6/2009 | Thompson | B60N 2/002 297/180.12 |
| 2011/0163576 A1 | * | 7/2011 | Akai | A47C 7/54 297/180.12 |
| 2012/0228903 A1 | * | 9/2012 | Abe | A47C 7/74 297/180.12 |
| 2013/0207422 A1 | * | 8/2013 | Potton | B60N 2/5685 297/180.12 |

FOREIGN PATENT DOCUMENTS

| | | |
|---|---|---|
| JP | 04-84040 U | 7/1992 |
| JP | 07-328249 A | 12/1995 |
| JP | 2002-065396 A | 3/2002 |
| JP | 2003-291708 A | 10/2003 |
| JP | 2004-249092 A | 9/2004 |
| JP | 2011-230588 A | 11/2011 |
| WO | WO 2008/145671 A2 | 12/2008 |

* cited by examiner

VEHICLE SEAT

CROSS REFERENCE TO RELATED APPLICATIONS

This application is a National Stage Entry application of PCT Application No. PCT/JP2013/071818, filed Aug. 12, 2013, which claims the priority benefit of Japanese Patent Application No. 2012-179636, filed Aug. 13, 2012, the contents of which are incorporated herein by reference.

BACKGROUND

Disclosed herein is a vehicle seat with seat heaters, and particularly, a vehicle seat with seat heaters arranged on a seat cushion and a seat back.

Conventionally, a variety of techniques that improve comfort when an occupant is seated by arranging a sheet-shaped heater on a vehicle seat have been proposed.

For example, as a vehicle seat with a seat heater arranged between a cushion pad and a skin of a seat cushion, such a vehicle seat described in Japanese Patent Publication No. H04-84040 U ("the '040 Document") is known.

As shown in its FIG. 10 and FIG. 11, this vehicle seat is constituted by placing a seat heater 102 on a surface of a cushion pad 101 of a seat cushion 100 and covering the cushion pad 101 and the seat heater 102 with a skin 103.

The seat heater 102 is composed of a heater wire 102a and a base material 102b for fixing the heater wire 102a, and a part of the seat heater 102 is inserted into a groove 101a provided on the surface of the cushion pad 101 to fold back and is assembled therein.

A leading-in cloth 103a inserted into the groove 101a is sewn on the skin 103, and a hanging member 104 is fixed further to the leading-in cloth 103a.

As shown in FIG. 11, the hanging member 104 is inserted into the groove 101a of the cushion pad 101, and is hooked to an insert wire 105 that was previously embedded in the cushion pad 101.

In this way, the seat heater 102 is fixed between the cushion pad 101 and the skin 103.

However, in the vehicle seat as in the '040 Document, although a part of the seat heater 102 is inserted into the groove 101a of the cushion pad 101 to fold back and is assembled therein, the extending direction of the heater wire 102a inserted into the groove 101a is not particularly considered. Therefore, when the heater wire 102a is inserted into the groove 101a to extend in the depth direction of the groove, in a case where the cushion pad 101 is deformed in a direction where the groove 101a is compressed due to a load applied when an occupant is seated, the heater wire 102a can also be deformed.

Thus, a vehicle seat with a seat heater capable of further suppressing deformation of a heater wire has been demanded in a case where a cushion pad is deformed in a direction where a groove portion is compressed.

At the same time, a vehicle seat with a seat heater capable of suppressing deformation of a heater wire without addition of component parts and improving durability has been demanded.

Moreover, in this vehicle seat, although a part of the seat heater 102 is inserted in the groove 101a of the cushion pad 101 to fold back and is assembled therein, details of assembling work are not considered. Therefore, a vehicle seat with a seat heater capable of reducing variations in products and further improving assembling workability has been demanded.

SUMMARY

Various embodiments of the invention take into consideration the above problems, and an object addressed herein is to provide a vehicle seat with seat heaters capable of suppressing deformation of a heater wire in a case where a cushion pad is deformed due to a load applied when an occupant is seated.

Another object is to provide a vehicle seat with seat heaters capable of suppressing deformation of a heater wire without addition of component parts and improving durability.

Another object is to provide a vehicle seat with seat heaters capable of reducing variations in products and improving assembling work.

Accordingly, the above problems are solved by a vehicle seat including a cushion pad, a skin for covering the cushion pad, and a seat heater between the cushion pad and the skin for covering the cushion pad, in which a groove is provided on a surface of the cushion pad; the seat heater includes a first heater wire and a second heater wire which are arranged on the opposite side to each other through the groove, and a groove portion heater wire provided in the groove for connecting the second heater wire with the first heater wire; the groove includes a first corner located on a side on which the first heater wire is arranged, of both ends of an opening of the groove, and a second corner located on a side on which the second heater wire is arranged; the groove portion heater wire includes one end portion extending toward a bottom of the groove beyond the first corner, the other end portion extending toward the bottom of the groove beyond the second corner, and a folded portion folded in the extending direction of the groove at the bottom of the groove; the folded portion is arranged in the central part of the groove in a direction of connecting the first heater wire with the second heater wire; and the extending direction of at least one of the one end portion and the other end portion of the groove portion heater wire is inclined with respect to the depth direction of the groove.

In this way, the groove portion heater wire has the one end portion extending toward the bottom of the groove beyond the first corner and the other end portion extending toward the bottom of the groove beyond the second corner, and the extending direction of the at least one of the one end portion and the other end portion of the groove portion heater wire is inclined with respect to the depth direction of the groove, so that, in particular, the cross-sectional area of the groove portion heater wire where a compressive force applied to the opening of the groove is received can be increased in a case where the cushion pad is deformed in a direction where the groove is compressed due to a load applied when an occupant is seated, and deformation of the heater wire provided in the groove can be suppressed.

Moreover, as thus configured, deformation of the heater wire can be suppressed without addition of component parts and durability can be improved.

Further, the groove portion heater wire includes a folded portion folded in the extending direction of the groove at the bottom of the groove, and the folded portion is arranged in the central part of the groove in a direction of connecting the first heater wire with the second heater wire. Therefore, when the seat heater is inserted into the groove provided on a surface of the cushion pad and is assembled therein, the seat heater can be assembled such that the folded portion of the groove portion heater wire is arranged in the central part of the groove so that assembling work is facilitated and variations in products can be reduced, thereby further suppressing subsequent deformation of the heater wire.

It is preferable that a region where the first heater wire is placed is located at a side where a deformation amount of the cushion pad with respect to a load applied to the cushion pad by seating of an occupant is larger than a region where the second heater wire is placed, of the surface of the cushion pad, and that the extending direction of the one end portion of the groove portion heater wire is inclined with respect to the depth direction of the groove.

As thus configured, at a side where a deformation amount of the cushion pad is larger, the cross-sectional area of the groove portion heater wire where a compressive force applied to the groove is received can be increased, and deformation of the heater wire provided in the groove can be further suppressed.

It is preferable that the first corner and the second corner are chamfered into an R-shape.

As thus configured, in particular, the cross-sectional area of the groove portion heater wire where a compressive force applied to the opening of the groove is received can be increased in a case where the cushion pad is deformed in a direction where the groove is compressed so that deformation of the heater wire provided in the groove can be further suppressed.

It is preferable that the groove portion heater wire includes one folded portion.

As thus configured, the one folded portion of the groove portion heater wire can be assembled to be arranged in the central part of the groove so that assembling work is further facilitated and variations in products can be reduced, thereby further suppressing subsequent deformation of the heater wire.

It is preferable that a positioning portion for arranging the seat heater on the cushion pad is provided on at least either one of the cushion pad and the seat heater, and that the positioning portion positions the seat heater at a position where the groove portion heater wire extends toward the bottom of the groove from at least one of the corners to be inclined with respect to the depth direction of the groove beyond the corner.

In this way, since the positioning portion for arranging the seat heater on the cushion pad is provided, assembling work can be improved.

It is preferable that the positioning portion consists of a concave portion provided on the surface of the cushion pad and a notch formed by notching a part of the seat heater, and that when the seat heater is arranged on the cushion pad, the position where the notch is provided is aligned with the position where the concave portion is provided.

In this way, since the cushion pad and the seat heater are assembled in such a manner that the position where the notch of the seat heater is provided is aligned with the position where the concave portion of the cushion pad is provided, assembling work can be further improved.

It is preferable that the positioning portion consists of a convex portion provided on the surface of the cushion pad and a notch formed by notching a part of the seat heater, and that when the seat heater is arranged on the cushion pad, the position where the notch is provided is aligned with the position where the convex portion is provided, and the notch is abutted to the convex portion.

In this way, since the cushion pad and the seat heater can be assembled in such a manner that the position where the notch of the seat heater is provided is aligned with the position where the convex portion of the cushion pad is provided and further the notch is abutted to the convex portion, assembling work can be further improved.

It is preferable that the heater wire including the first heater wire, the second heater wire, and the groove portion heater wire, extends to intersect with the groove, that the groove includes a first region where the groove portion heater wire extends and a second region different from the first region, and that the first region includes an escape portion in which the length along the extending direction of the heater wire at the opening is longer than the second region.

In this way, since the first region includes the escape portion in which the length along the extending direction of the heater wire at the opening is longer than the second region, the region including the groove portion heater wire can suppress a deformation amount of the cushion pad in a case where the cushion pad is deformed in a direction where the groove is compressed so that deformation of the heater wire provided in the groove can be further suppressed.

It is preferable that the escape portion widens in a tapered shape from the bottom of the groove toward the opening thereof.

As thus configured, a larger compressive force is applied to the opening of the groove than the bottom of the groove in a case where the cushion pad is deformed in a direction where the groove is compressed so that, by widening the escape portion in a tapered shape from the bottom of the groove toward the opening thereof, a deformation amount of the cushion pad can be further suppressed and deformation of the heater wire provided in the groove can be further suppressed.

It is preferable that the escape portion includes concave portions arranged on the opposite side to each other through the groove, and that the concave portion are recessed in the bottom direction of the groove and are shallower than the depth of the groove.

As thus configured, a larger compressive force is applied to the opening of the groove than the bottom of the groove in a case where the cushion pad is deformed in a direction where the groove is compressed so that, by providing the concave portions shallower than the depth of the groove on both sides of the groove, a deformation amount of the cushion pad can be further suppressed and deformation of the heater wire provided in the groove can be further suppressed.

It is preferable that the groove includes a regulation member in a region different from a region where the groove portion heater wire extends in the extending direction of the groove.

In this way, the groove includes the regulation member and the regulation member regulates deformation of the cushion pad in a direction where the groove is compressed in a case where the cushion pad is deformed in a direction where the groove is compressed so that deformation of the heater wire provided in the groove can be further suppressed.

It is preferable that a hanging member inserted into the groove is attached to the skin, and that the regulation member is attached to the skin together with the hanging member.

As thus configured, the regulation member can be attached simultaneously with the work to insert the hanging member into the groove so that assembling work can be further improved.

In various embodiments, the groove portion heater wire has the one end portion extending toward the bottom of the groove beyond the first corner and the other end portion extending toward the bottom of the groove beyond the second corner, and the extending direction of the at least one of the one end portion and the other end portion of the groove portion heater wire is inclined with respect to the depth direction of the groove so that, in particular, the cross-sectional area of the groove portion heater wire where a compressive force applied to the opening of the groove is received can be increased in a case where the cushion pad is deformed in a direction where the groove is compressed due to a load applied when an occupant is seated, and deformation of the heater wire provided in the groove can be suppressed.

Moreover, as thus configured, deformation of the heater wire can be suppressed without addition of component parts and durability can be improved.

Further, the groove portion heater wire includes the folded portion folded in the extending direction of the groove at the bottom of the groove, and the folded portion is arranged in the central part of the groove in a direction of connecting the first heater wire with the second heater wire. Therefore, when the seat heater is inserted into the groove provided on the surface of the cushion pad and is assembled therein, the seat heater can be assembled such that the folded portion of the groove portion heater wire is arranged in the central part of the groove so that assembling work is facilitated and variations in products can be reduced, thereby further suppressing subsequent deformation of the heater wire.

According to various embodiments, at a side where a deformation amount of the cushion pad is larger, the cross-sectional area of the groove portion heater wire where a compressive force applied to the groove is received can be increased, and deformation of the heater wire provided in the groove can be further suppressed.

According to various embodiments, in particular, the cross-sectional area of the groove portion heater wire where a compressive force applied to the opening of the groove is received can be increased in a case where the cushion pad is deformed in a direction where the groove is compressed so that deformation of the heater wire provided in the groove can be further suppressed.

According to various embodiments, the one folded portion of the groove portion heater wire can be assembled to be arranged in the central part of the groove so that assembling work is further facilitated and variations in products can be reduced, thereby further suppressing subsequent deformation of the heater wire.

According to various embodiments, since the positioning portion for arranging the seat heater on the cushion pad is provided, assembling work can be improved.

According to various embodiments, since the cushion pad and the seat heater are assembled in such a manner that the position where the notch of the seat heater is provided is aligned with the position where the concave portion of the cushion pad is provided, assembling work can be further improved.

According to various embodiments since the cushion pad and the seat heater can be assembled in such a manner that the position where the notch of the seat heater is provided is aligned with the position where the convex portion of the cushion pad is provided and further the notch is abutted to the convex portion, assembling work can be further improved.

According to various embodiments, since the first region includes the escape portion in which the length along the extending direction of the heater wire at the opening is longer than the second region, the region including the groove portion heater wire can suppress a deformation amount of the cushion pad in a case where the cushion pad is deformed in a direction where the groove is compressed so that deformation of the heater wire provided in the groove can be further suppressed.

According to various embodiments, a larger compressive force is applied to the opening of the groove than the bottom of the groove in a case where the cushion pad is deformed in a direction where the groove is compressed so that, by widening the escape portion in a tapered shape from the bottom of the groove toward the opening thereof, a deformation amount of the cushion pad can be further suppressed and deformation of the heater wire provided in the groove can be further suppressed.

According to various embodiments, a larger compressive force is applied to the opening of the groove than the bottom of the groove in a case where the cushion pad is deformed in a direction where the groove is compressed so that by providing the concave portions shallower than the depth of the groove on both sides of the groove, a deformation amount of the cushion pad can be further suppressed and deformation of the heater wire provided in the groove can be further suppressed.

According to various embodiments, the groove includes the regulation member and the regulation member regulates deformation of the cushion pad in a direction where the groove is compressed in a case where the cushion pad is deformed in a direction where the groove is compressed so that deformation of the heater wire provided in the groove can be further suppressed.

According to various embodiments, the regulation member can be attached simultaneously with the work to insert the hanging member into the groove so that assembling work can be further improved.

DETAILED DESCRIPTION

Hereinafter, embodiments of the present invention will be described with reference to the drawings. The members, the arrangements and the like described below do not limit the present invention, and can be modified into various forms in accordance with the spirit of the present invention.

The present embodiment is an invention related to a vehicle seat with seat heaters.

Figure 1:
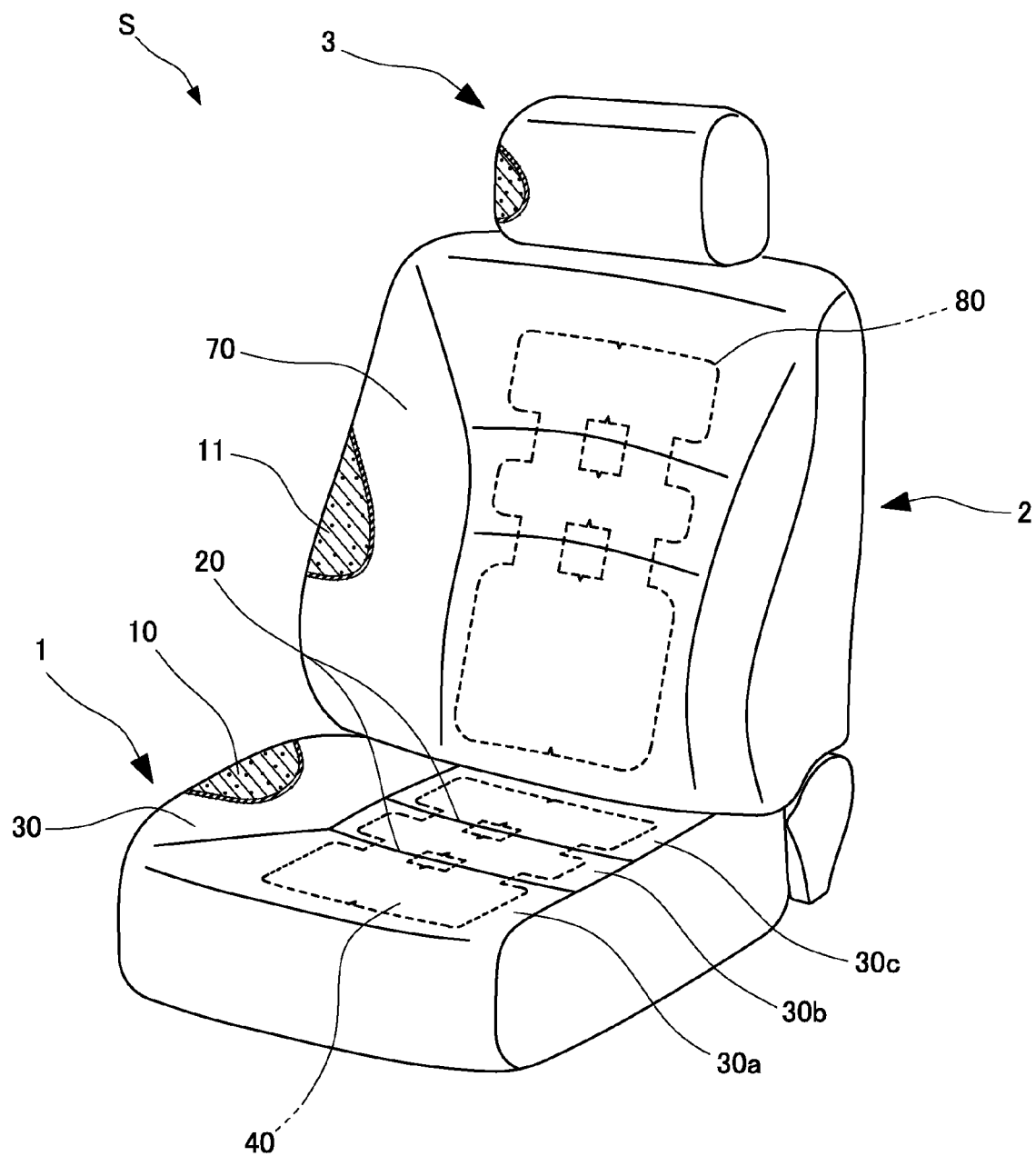
FIG. 1 is a schematic perspective view of a vehicle seat according to various embodiments of the present invention.

As shown in FIG. 1, a vehicle seat S of the present embodiment is mainly composed of a seat cushion 1, a seat back 2 arranged on the back surface side of the seat cushion 1, and a head rest 3 arranged on the top surface side of the seat back 2.

A side on which an occupant is seated with respect to the seat back 2 of the vehicle seat S is defined herein as the front side.

The seat cushion 1 is a seating portion supporting the occupant from below, and is mainly composed of a seat cushion frame (not shown) forming part of a seat frame, a cushion pad 10 placed on the seat cushion frame, and a skin 30 covering the seat cushion frame and the cushion pad 10.

The seat cushion 1 of the present embodiment further includes a seat heater 40 between the cushion pad 10 and the skin 30. The configuration of the seat heater 40 will be described later.

The seat back 2 is a backrest portion supporting the back of the occupant from behind, and is mainly composed of a seat back frame (not shown) forming part of a seat frame, a cushion pad 11 placed on the seat back frame, and a skin 70 covering the seat back frame and the cushion pad 11.

The seat back 2 of the present embodiment further includes a seat heater 80 between the cushion pad 11 and the skin 70.

The head rest 3 is a head portion supporting the head of the occupant from behind, and is formed by arranging the cushion pad on a pillar (not shown) forming a core and by covering them with the skin.

Figure 2:
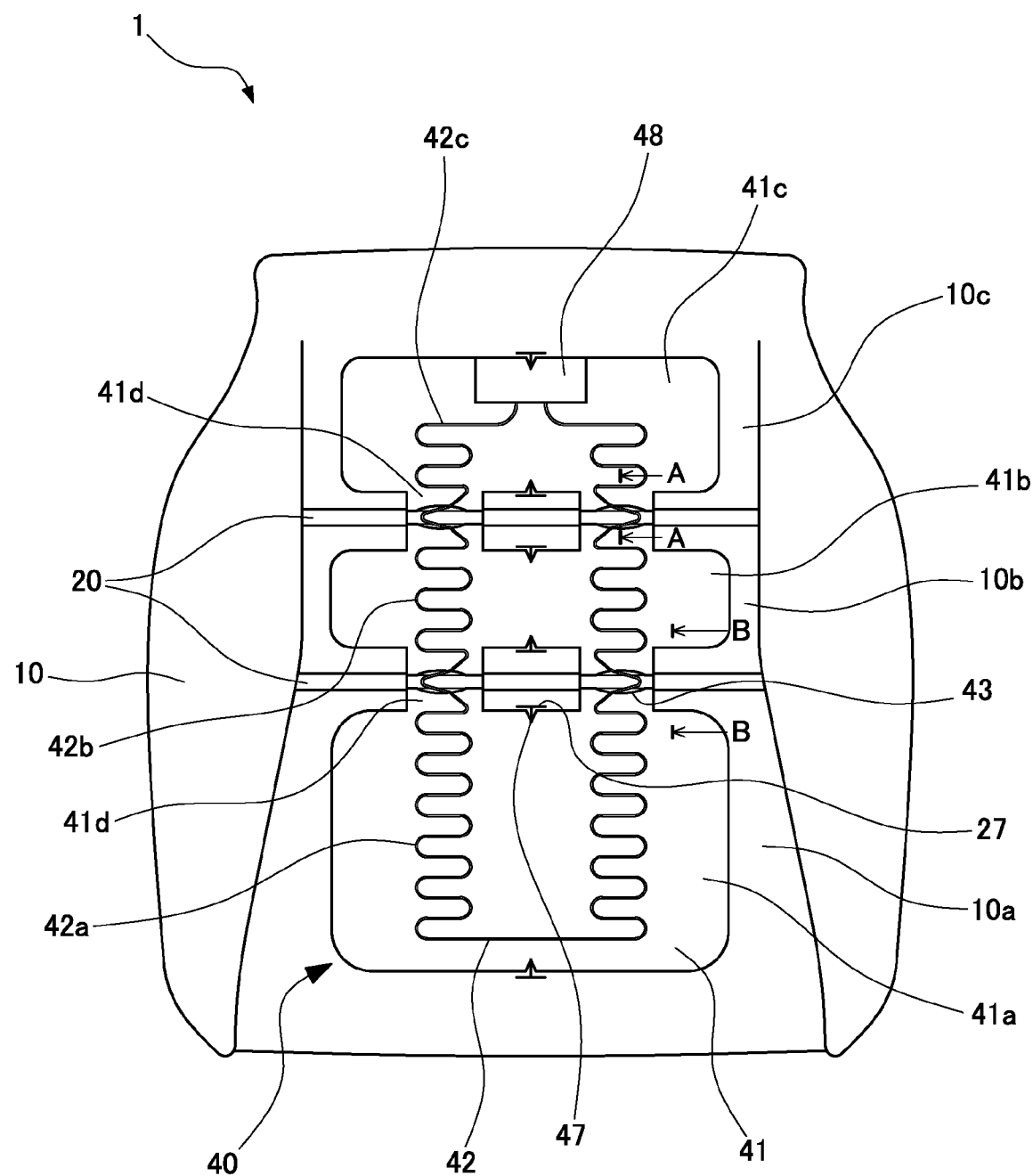
FIG. 2 is a schematic top view of a seat cushion according to various embodiments of the present invention, showing a state in which a seat heater is placed on a cushion pad.

The cushion pad 10 is a pad member made of urethane foam or the like, and is composed of a front pad 10a located on the front side, a center pad 10b located on the center side, and a rear pad 10c located on the rear side, of the cushion pad 10, as shown in FIG. 2.

On the top surface of the cushion pad 10, grooves 20 elongated in the right and left direction of the vehicle seat S are formed.

The grooves 20 are provided at two points to divide the top surfaces of the front pad 10a and the center pad 10b and divide the top surfaces of the center pad 10b and the rear pad 10c in the front to back direction.

Figure 4A:
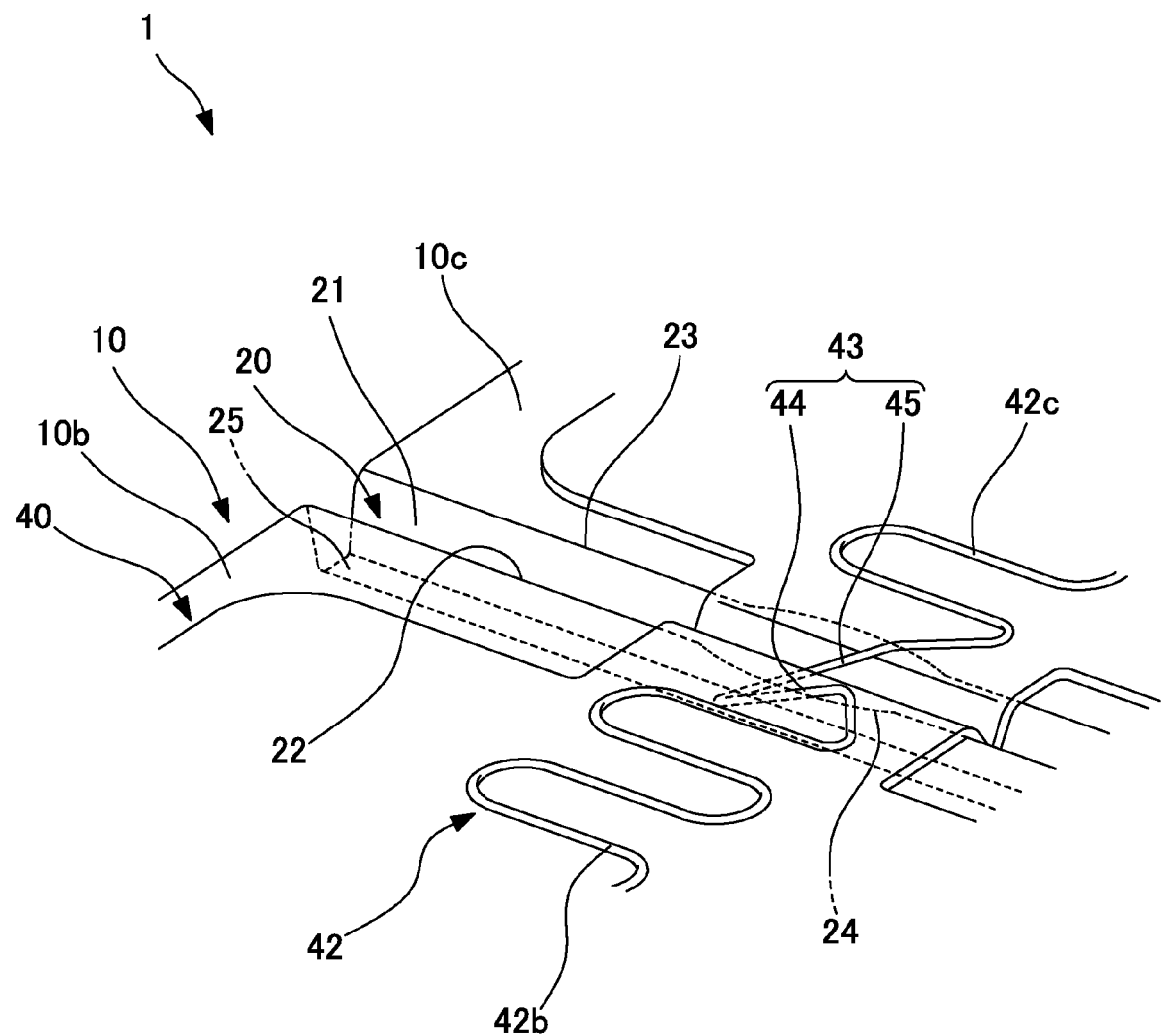
FIG. 4A is a schematic perspective view of the seat cushion of FIG. 2 showing a first embodiment of the present invention, and is a main part enlarged view illustrating a state in which the seat heater is inserted into a groove.
Figure 4B:
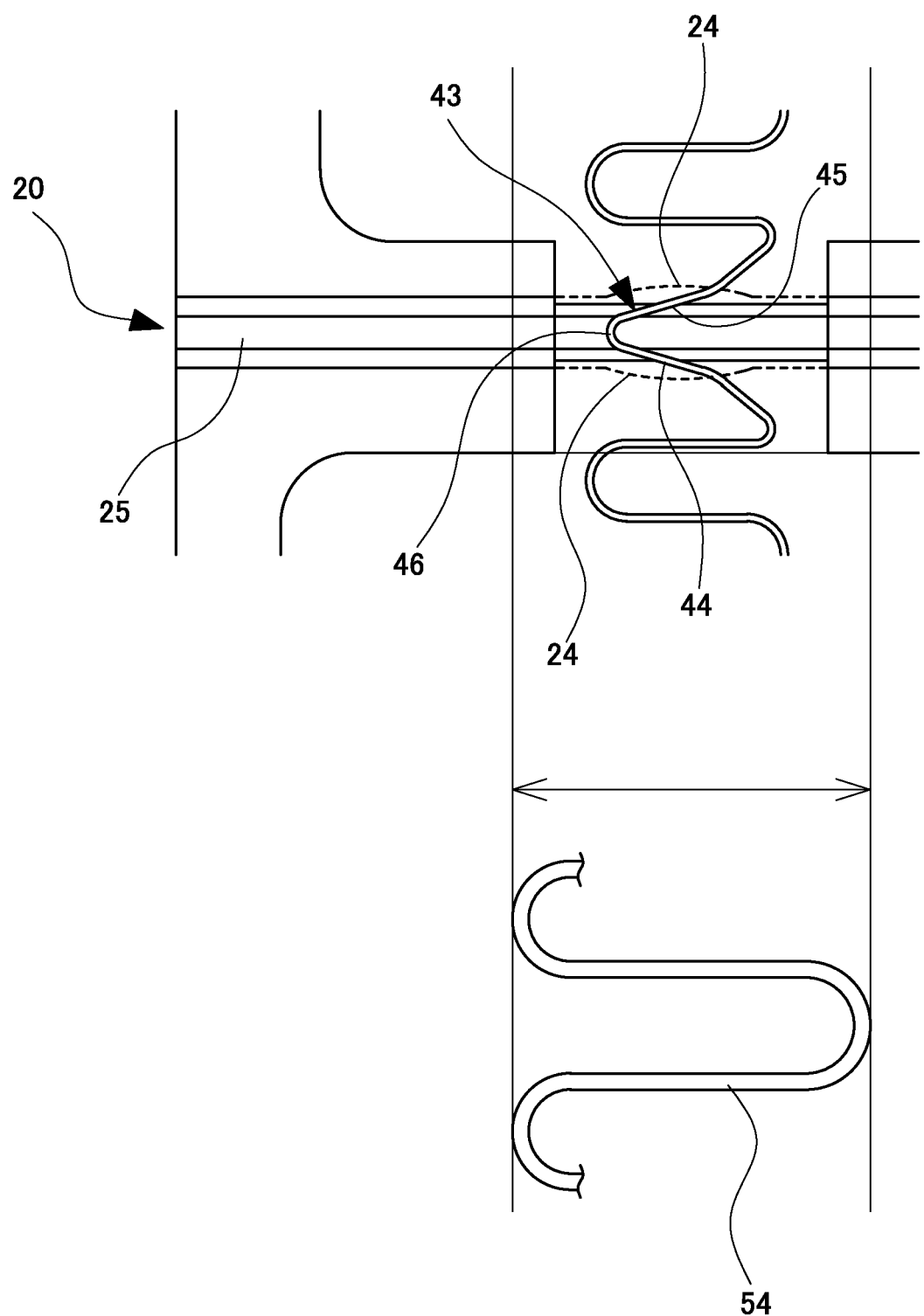
FIG. 4B is a schematic top view of the seat cushion of FIG. 4A, and is a main part enlarged view illustrating a state in which the seat heater is inserted into the groove.

As shown in FIG. 4A and FIG. 4B, each groove 20 is formed in a substantially U-shape in longitudinal section in the right and left direction, and includes a first corner 22 located on the front side of an opening 21 and chamfered into an R-shape over the whole right and left direction, and a second corner 23 located on the rear side of the opening 21 and chamfered into an R-shape over the whole.

Moreover, in each groove 20, escape portions 24 wider than the groove width in the front to back direction are provided at two points at interval in the right and left direction.

Figure 5:
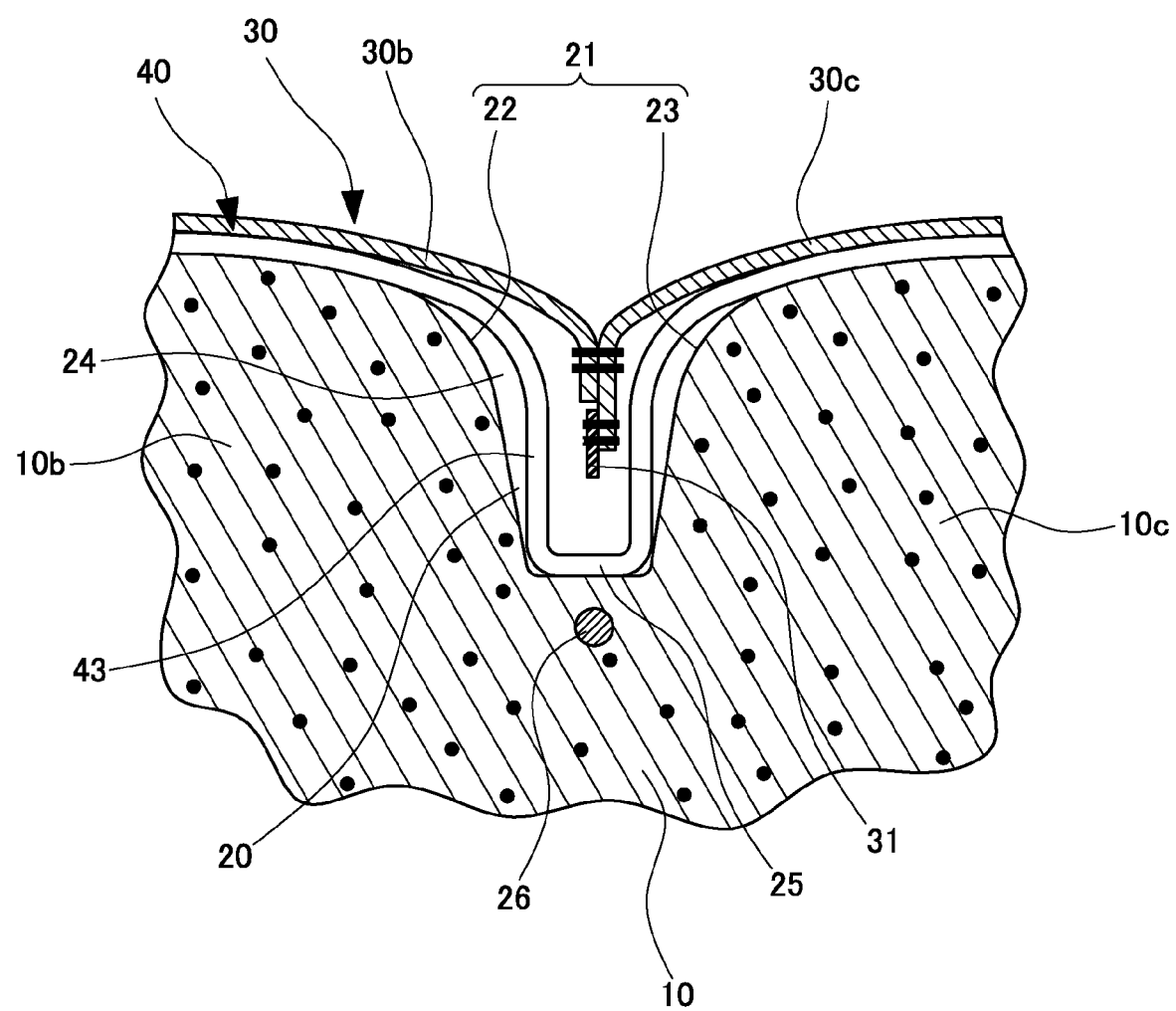
FIG. 5 is an illustrated cross-sectional view of the A-A section of the cushion pad of FIG. 2 showing the first embodiment of the present invention viewed from the side.

As shown in FIG. 5, the escape portion 24 is formed as a hole widening in a tapered shape toward the opening 21 from a groove bottom 25.

As shown in FIG. 5, within the cushion pad 10 and below each groove 20, an insert wire 26 having a substantially circular cross section elongated in the right and left direction is embedded.

Figure 7:
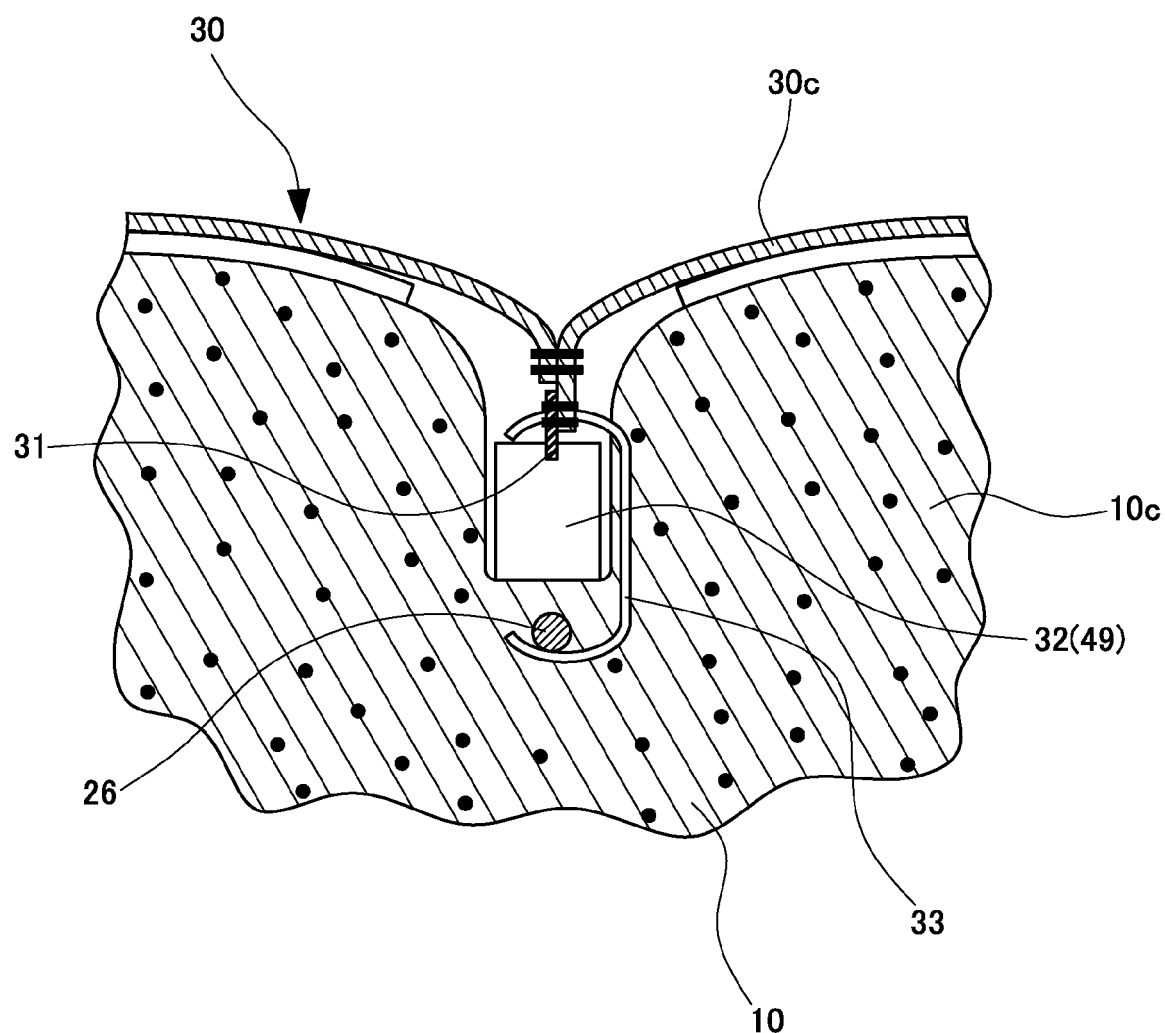
FIG. 7 is an illustrated cross-sectional view of the B-B section of the cushion pad of FIG. 2 showing the first embodiment of the present invention viewed from the side.

The insert wire 26 is formed of a known metallic material or hard resin material, and is connected and fixed to a hanging member 32 through a C-ring 33 shown in FIG. 7.

Moreover, as shown in FIG. 2, on the top surface of the cushion pad 10, concave portions 27 are provided in the center of the right and left direction of the cushion pad 10, near both sides of the front to back direction of each groove 20 and at both end portions of the front to back direction of the seat heater 40.

The concave portions 27 are positioning portions for placing the seat heater 40 on the cushion pad 10, and are formed in plural as grooves recessed in a T-shape.

It is desirable that a T-shaped mark of the concave portion of the present embodiment is formed such that the width of the right and left direction of the portion extending in the front to back direction is 2 mm and the width of the front to back direction of the portion extending in the right and left direction is 2 mm. Moreover, it is desirable that the depth of the concave portion 27 is formed to be 2 mm.

The skin 30 is made of a publicly known nylon material or the like having stretchability, and is formed into a shape capable of covering the cushion pad 10 from above.

The skin 30 includes a skin 30a, a skin 30b, and skin 30c shown in FIG. 1 at positions corresponding to the respective top surfaces of the front pad 10a, the center pad 10b, and the rear pad 10c shown in FIG. 2 in the front to back direction.

The skin 30a and the skin 30b are sewn and connected together at a position corresponding to the groove 20 provided between the skin 30a and the skin 30b in the front to back direction. Similarly, the skin 30b and the skin 30c are connected together at a position corresponding to the groove 20 provided between the skin 30b and the skin 30c.

As shown in FIG. 5, to the skin 30, a leading-in cloth 31 for leading the skin 30 into the groove 20 is attached at the position above the groove 20 and where the skin 30b and the skin 30c are sewn.

The leading-in cloth 31 is made of the same nylon material or the like as the skin 30, is sewn on the skin 30b to face the groove 20 over the whole in the right and left direction, and extends to the groove bottom 25 side.

As shown in FIG. 7, the hanging members 32 are attached in plural to the end portion of the groove bottom 25 side of the leading-in cloth 31 at intervals in the right and left direction.

The hanging member 32 is formed in a substantially rectangular shape in cross section formed of a publicly known hard resin material.

The skin 30 is fixed to the cushion pad 10 by hooking each hanging member 32 to the insert wire 26 through the C-ring 33 formed in a substantially C-shape in cross section.

The seat heater 40 is a planar heating element for warming the seat cushion 1, and is mainly composed of a planar base material 41 made of a polyester cloth material or the like, and a heater wire 42 adhesively fixed to the base material 41, as shown in FIG. 2.

The seat heater 40 may be formed by fixing the heater wire 42 and a detection wire (not shown) for detecting the seating of the occupant to the base material 41. As thus configured, the seating of the occupant is accurately detected, thereby capable of warming the seat cushion 1. Moreover, the heater wire 42 and the detection wire can be arranged on the seat heater 40 while freely setting the positional relationship between them.

The base material 41 is formed in a substantially rectangular shape formed of a stretchable cloth material, and is made up of substantially rectangular shaped front planar body 41a, center planar body 41b and rear planar body 41c respectively placed on the top surfaces of the front pad 10a, the center pad 10b and the rear pad 10c, and substantially rectangular shaped connecting planar bodies 41d connecting these front planar body 41a, center planar body 41b and rear planar body 41c together and inserted into the groove 20 and placed thereon, as shown in FIG. 2.

The rear of the front planar body 41*a* and the front of the center planar body 41*b* are connected through two connecting planar bodies 41*d* provided at interval in the right and left direction. Similarly, the rear of the center planar body 41*b* and the front of the rear planar body 41*c* are connected through two connecting planar bodies 41*d*.

In the front planar body 41*a*, the center planar body 41*b* and the rear planar body 41*c*, notches 47 notched to be substantially V-shaped are formed at the front end portion and the rear end portion in the center of the right and left direction.

The respective notches 47 are positioning portions for placing the seat heater 40 on the cushion pad 10. They are arranged in such a manner that the V-shaped marks of the respective notches 47 and the T-shaped marks of the respective concave portions 27 are matched when the seat heater 40 is properly placed on the cushion pad 10.

Moreover, the positioning portions for placing the seat heater 40 on the cushion pad 10 are not limited thereto, and can be changed.

In other embodiments, on the top surface of the cushion pad 10, convex portions (not shown) may be provided near both sides of the front to back direction of each groove 20 in the center of the right and left direction of the cushion pad 10.

The convex portions are formed in plural as protruding portions protruding in a T-shape, and may be arranged in such a manner that the T-shaped marks of the respective convex portions and the V-shaped marks of the respective notches 47 are matched.

As thus configured, the T-shaped marks of the respective convex portions on the top surface of the cushion pad 10 and the V-shaped marks of the respective notches 47 of the seat heater 40 are matched and mutually abutted so that the accuracy of positioning is improved.

The heater wire 42 is adhesively fixed on the base material 41, and as shown in FIG. 2, two heater wires 42 meander substantially in parallel from the rear of the seat cushion 1 toward the front and are connected at the front portion.

Although the heater wire 42 of the present embodiment is fixed on the base material 41 while meandering substantially in parallel in the front to back direction, the present embodiment is not limited thereto, and the arrangement of the heater wire 42 may be appropriately changed.

Moreover, although the heater wire 42 is fixed on the base material 41 with an adhesive, the heater wire 42 may be fixed to be folded into the base material 41.

As shown in FIG. 2, the heater wire 42 is made up of a front heater wire 42*a* placed on the front planar body 41*a* of the base material 41, a center heater wire 42*b* placed on the center planar body 41*b*, a rear heater wire 42*c* placed on the rear planar body 41*c*, and a groove portion heater wire 43 placed on the connecting planar body 41*d*, connecting the front heater wire 42*a*, the center heater wire 42*b* and the rear heater wire 42*c* together, and inserted into the groove 20 and placed thereon.

To the rear of the heater wire 42, a thermostat 48 detecting the temperature of the seat heater 40, a controller (not shown) for performing temperature control of the seat heater 40, a connector (not shown) connected to an electric wire of a vehicle body side, and the like are attached.

As shown in FIG. 4A and FIG. 4B, the groove portion heater wire 43 is a heater wire extending to be inclined to the right and left outer sides (the outer end sides of the right and left direction of the seat cushion 1) with respect to the front to back direction toward the opening 21 of the groove 20 and further extending toward the groove bottom 25 from the opening 21, and is made up of a front groove portion heater wire 44 extending toward the groove bottom 25 beyond the first corner 22 from the front side, and a rear groove portion heater wire 45 extending toward the groove bottom 25 beyond the second corner 23 from the rear side.

The relationship between the front groove portion heater wire 44 and the rear groove portion heater wire 45 corresponds to the relationship between one end portion and the other end portion of embodiments.

As shown in FIG. 4A, the front groove portion heater wire 44 and the rear groove portion heater wire 45 extend toward the opening 21, extend to be inclined to the right and left outer sides (the outer end sides of the right and left direction of the seat cushion 1) from the opening 21 with respect to the depth direction of the groove 20, further extend on the groove bottom 25, and are connected together in almost the center of the front to back width direction of the groove bottom 25.

In other words, the groove portion heater wire 43 extends to be inclined to the right and left outer sides (the outer end sides of the right and left direction of the seat cushion 1) with respect to the depth direction of the groove 20 toward the groove bottom 25 beyond the first corner 22 from the front side, extends on the groove bottom 25, is folded in almost the center of the front to back width direction of the groove bottom 25, extends to be inclined to the right and left inner side (the center side of the right and left direction of the seat cushion 1) with respect to the opening direction of the groove 20 toward the opening 21 from the groove bottom 25, and extends to the rear side beyond the second corner 23.

As shown in FIG. 4B, the groove portion heater wire 43 includes one folded portion 46 folded in the right and left direction in almost the center of the groove bottom 25, and is formed in a plane-symmetrical shape with respect to an almost central plane of the width direction of the groove 20 passing through the folded portion 46.

Therefore, when the cushion pad 10 is deformed in a direction where the groove 20 is compressed with respect to a load applied when an occupant is seated, or the like, the case where the groove portion heater wire 43 has a shape extending to be inclined to the right and left outer sides with respect to the depth direction of the groove 20 can increase the cross-sectional area of the portion compressively sandwiched between the first corner 22 and the second corner 23 of the opening 21 viewed from the front to back direction more than the case where it has a shape extending in the depth direction from the opening 21 so that deformation of the groove portion heater wire 43 can be suppressed.

The groove portion heater wire 43 of the present embodiment extends to be inclined to the right and left outer sides from the opening 21 with respect to the depth direction of the groove 20, but is not limited thereto and may extend to be inclined to the right and left inner side with respect to the depth direction of the groove 20.

Moreover, the groove portion heater wire 43 includes one folded portion 46 folded in almost the center of the groove bottom 25, but is not limited thereto and may be formed in a shape including a plurality of folded portions 46.

Below the groove portion heater wire 43 and further below the cushion pad 10, as shown in FIG. 4B, an S spring 54 made of a wave-shaped linear member is provided, and the S spring 54 is overlapped with the cushion pad 10 in the up and down direction.

The S spring 54 is a component of the seat cushion frame (not shown), is an elastic member supporting the cushion pad 10 from below, and is wider in the right and left direction than the groove portion heater wire 43. A plurality of S springs 54 are extendedly arranged to meander substantially in parallel in the front to back direction at predetermined intervals in the right and left direction.

It should be noted that the seat cushion frame is made of a substantially rectangular shaped frame body, and is mainly composed of a pair of side frames (not shown) arranged at both right and left ends, a pan frame (not shown) as a plate-shaped frame hung on the top surface of the front of the respective side frames, a member pipe (not shown) as a connecting member hung near the back side end portion of the respective side frames, and the S spring 54 connecting the pan frame and the member pipe in the front to back direction.

In this way, since the S spring 54 is provided below the groove portion heater wire 43 and further below the cushion pad 10, in a case where the cushion pad 10 is deformed in the compressed direction due to a load applied when an occupant is seated, the S spring 54 can support the cushion pad 10 and the seat heater 40 as the elastic member to suppress deformation of them, and deformation of the groove portion heater wire 43 can be suppressed.

As shown in FIG. 5, the groove 20 includes the first corner 22 and the second corner 23 which are chamfered into an R-shape over the whole right and left direction of the groove 20.

Therefore, when the cushion pad 10 is deformed in a direction where the groove 20 is compressed with respect to a load applied by seating of an occupant, or the like, the groove portion heater wire 43 can increase the cross-sectional area of the portion compressively sandwiched between the first corner 22 and the second corner 23 viewed from the front to back direction so that deformation of the groove portion heater wire 43 can be suppressed.

As to the groove 20 of the present embodiment, it is desirable that the groove width in the front to back width direction is formed to be 10-15 mm, and that the size of the R-shaped chamfered corner is formed to be 10-650 mm with respect to the groove width.

Moreover, as shown in FIG. 5, the groove 20 includes the escape portions 24 respectively on the portions through which the two groove portion heater wires 43 are passing in the right and left direction of the groove 20.

Therefore, when the cushion pad 10 is deformed in a direction where the groove 20 is compressed, a deformation amount of the cushion pad can be suppressed particularly on the portions through which the two groove portion heater wires 43 are passing so that deformation of the groove portion heater wire 43 can be further suppressed.

As to the groove 20 of the present embodiment, it is desirable that the groove width of the escape portion 24 in the front to back width direction is formed to be 10-25 mm.

As shown in FIG. 5, the escape portion 24 of the present embodiment is formed as a hole widening in a tapered shape toward the opening 21 side from the groove bottom 25, but is not limited thereto and can be changed.

Figure 8:
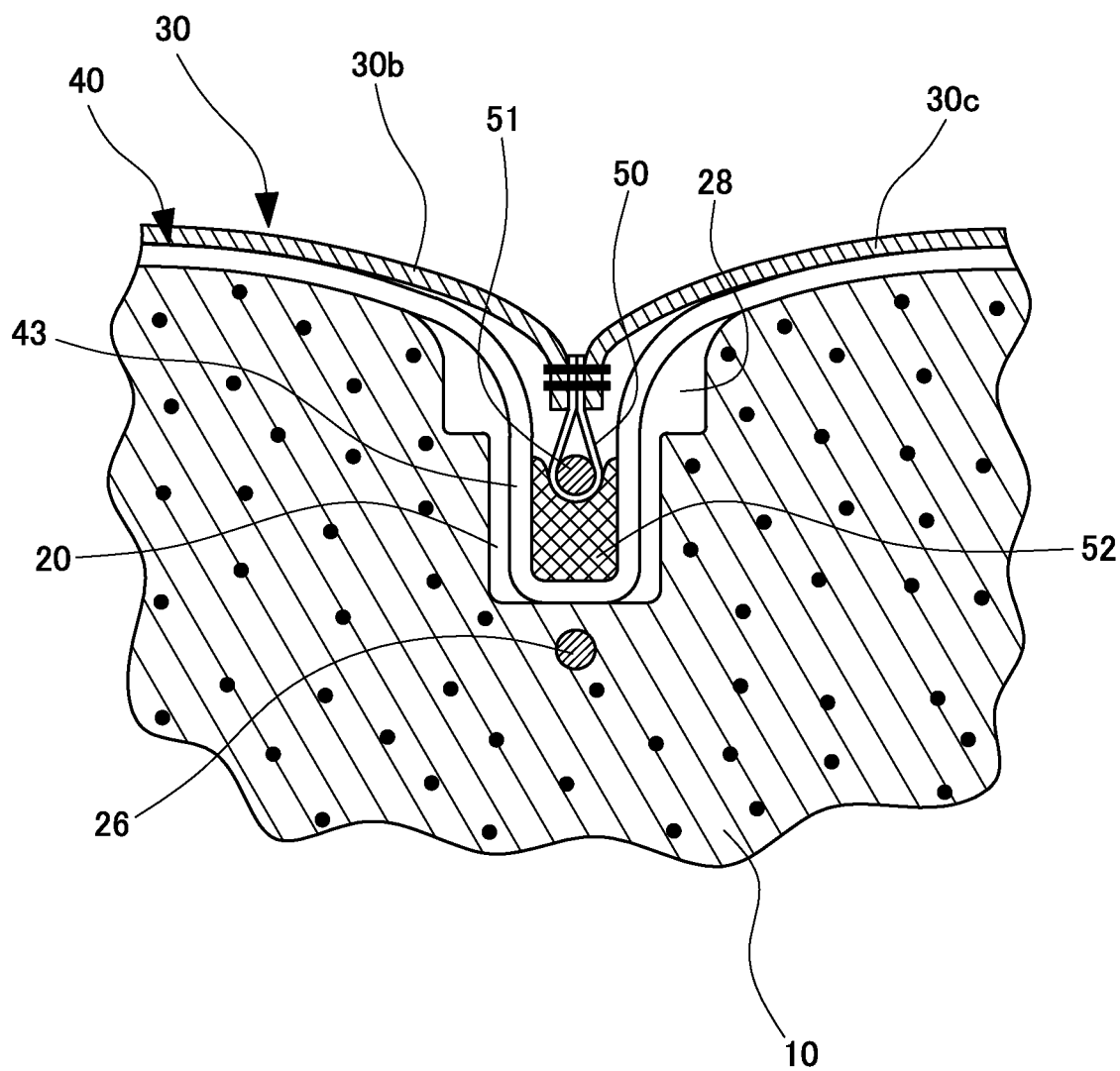
FIG. 8 is an illustrated cross-sectional view of the A-A section of the cushion pad of FIG. 2 showing a third embodiment of the present invention viewed from the side.

In other embodiments, as shown in FIG. 8, escape portions 28 may be provided as substantially rectangular shaped concave portions formed to be shallower than the depth of the groove 20 on both sides of the front to back direction of the groove 20.

The escape portions 28 are provided on the portions through which the two groove portion heater wires 43 are passing in the right and left direction of the groove 20.

As thus configured, when the cushion pad 10 is deformed in a direction where the groove 20 is compressed, a deformation amount of the cushion pad 10 can be suppressed particularly on the portions through which the two groove portion heater wires 43 are passing so that deformation of the groove portion heater wire 43 can be further suppressed.

Next, the configuration in which the seat heater 40 is fixed on the top surface of the cushion pad 10, and the cushion pad 10 and the seat heater 40 are covered with the skin 30 will be described with reference to FIG. 5 and FIG. 7.

Within each groove 20 of the cushion pad 10, the portion including the groove portion heater wire 43 of the seat heater 40 is inserted and attached.

Above each groove 20, the leading-in cloth 31 sewn on the end portion of the skin 30c is provided over the whole in the right and left direction.

Of each groove 20, on the portions other than the portion through which the groove portion heater wire 43 is passing in the right and left direction, as shown in FIG. 7, the hanging members 32 attached to the leading-in cloth 31 are dividedly provided at three points.

The number of the hanging members 32 is not limited to three and a plurality of hanging members 32 may be provided.

The skin 30 is fixed to the cushion pad 10 by hooking each hanging member 32 connected to the skin 30c to the insert wire 26 elongated in the right and left direction and embedded in the cushion pad 10 through the C-ring 33.

Moreover, since the hanging member 32 is provided above the portion not including the groove portion heater wire 43 of the seat heater 40 inserted into each groove 20, the seat heater 40 is supported by the whole skin 30, particularly by the hanging member 32, thereby the seat heater 40 also is fixed to the top surface of the cushion pad 10.

In a case where the cushion pad 10 is deformed in a direction where the groove 20 is compressed with respect to a load applied by seating of an occupant, or the like, the hanging member 32 provided within the groove 20 can be used as a regulation member regulating deformation to narrow the width of the front to back direction of the groove 20.

In the present embodiment, the hanging member 32 provided within the groove 20 is used as the regulation member, but is not limited thereto and can be changed.

In other embodiments, of each groove 20, on the portions other than the portion through which the groove portion heater wire 43 is passing in the right and left direction, a regulation member 49 made of a hard resin material may be separately attached and provided to the leading-in cloth 31 in addition to the hanging member 32.

As thus configured, within each groove 20, the hanging member 32 and the regulation member 49 can be simultaneously attached to the leading-in cloth 31, so that assembling work can be improved.

As shown in FIG. 5, the insert wire 26 is embedded in the cushion pad 10 to be arranged just below almost the center of the front to back width direction of the groove 20. Therefore, in a case where the cushion pad 10 is deformed in the compressed direction due to a load applied when an occupant is seated, the insert wire 26 can support the cushion pad 10 and the seat heater 40 to suppress deformation of them, and deformation of the groove portion heater wire 43 can be suppressed.

Moreover, in the present embodiment, the insert wire 26 is arranged just below almost the center of the front to back width direction of the groove 20, but is not limited thereto and can be changed.

Figure 6:
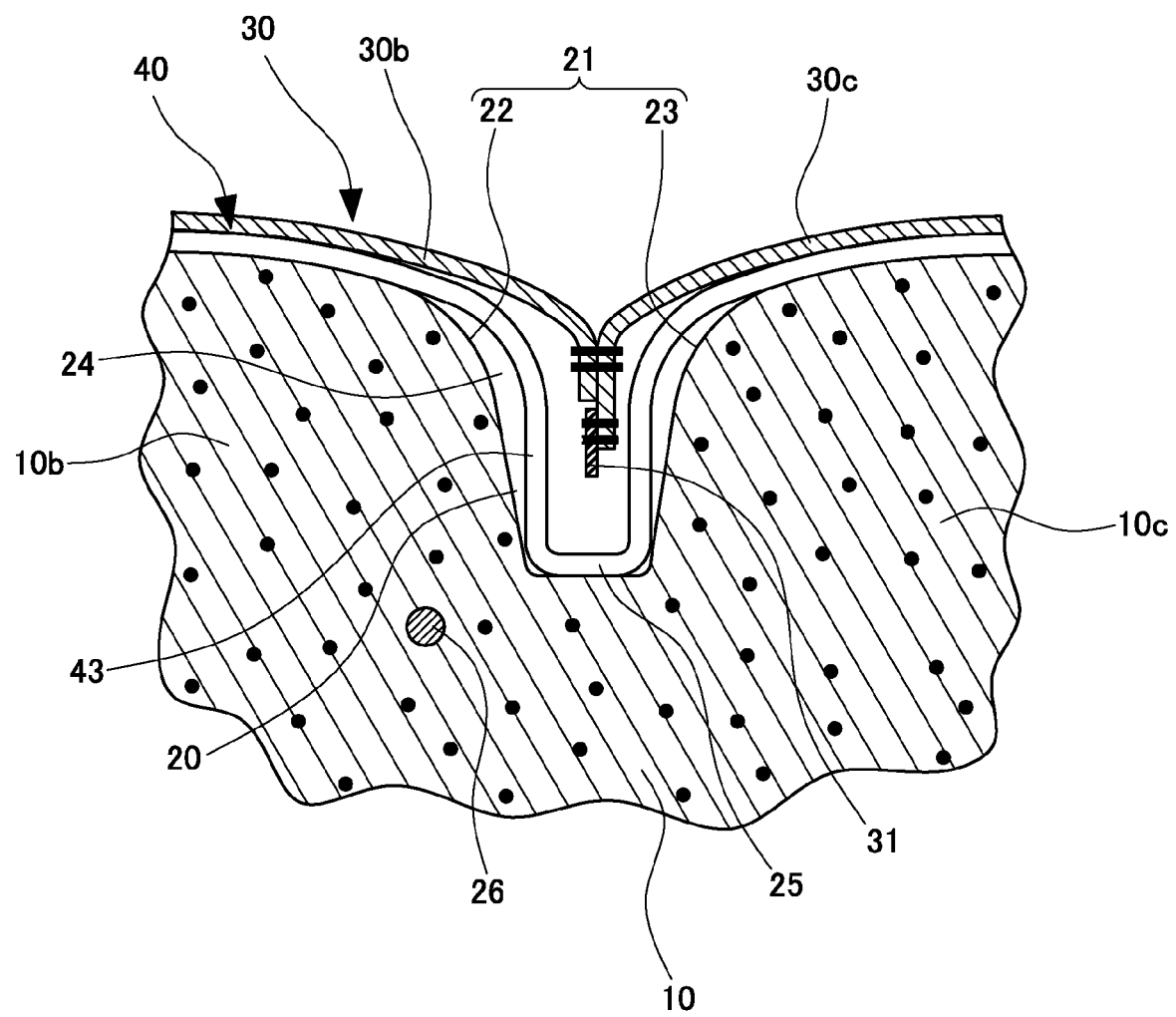
FIG. 6 is an illustrated cross-sectional view of the A-A section of the cushion pad of FIG. 2 showing a second embodiment of the present invention viewed from the side.

In other embodiments, as shown in FIG. 6, the insert wire 26 may be embedded in the cushion pad 10 in such a manner that it is arranged on a little front side in the front to back direction than just below almost the center of the front to back width direction of the groove 20.

As thus configured, in a case where the cushion pad 10 is deformed in the compressed direction due to a load applied when the occupant is seated, the groove portion heater wire 43 can be hardly subjected to the force because it is sandwiched by a compressive force due to deformation of the cushion pad 10 and a supporting force of the insert wire 26 supporting deformation of the cushion pad 10, so that deformation of the groove portion heater wire 43 can be suppressed.

Next, in other embodiments, the configuration in which the seat heater 40 is fixed on the top surface of the cushion pad 10, and the cushion pad 10 and the seat heater 40 are covered with the skin 30 will be described with reference to FIG. 8 and FIG. 9.

Within the groove 20 of the cushion pad 10, the portion including the groove portion heater wire 43 of the seat heater 40 is inserted and attached.

Above each groove 20, a leading-in cloth 50 sewn on the end portion of the skin 30b and a hanging wire 51 having a substantially circular cross section attached within the leading-in cloth 50 are provided over the whole in the right and left direction.

Moreover, a buffering member 52 is provided on the top surface of each groove 20 or the portion into which the seat heater 40 is inserted over the whole in the right and left direction.

The buffering member 52 is made of the same urethane foam or the like as the cushion pad 10, and is formed in a substantially rectangular shape in cross section.

The buffering member 52 may be arranged only on the top surface of the portion into which the seat heater 40 is inserted in the right and left direction of each groove 20.

In this way, by fitting the buffering member 52 into the top surface of the portion where the seat heater 40 is inserted into the groove 20 of the groove 20, the seat heater 40 can be fixed to the cushion pad 10 until after the cushion pad 10 and the seat heater 40 are covered with the skin 30 and fixed thereon.

The leading-in cloth 50 within which the hanging wire 51 is attached is placed on the top surface of the buffering member 52.

Figure 9:
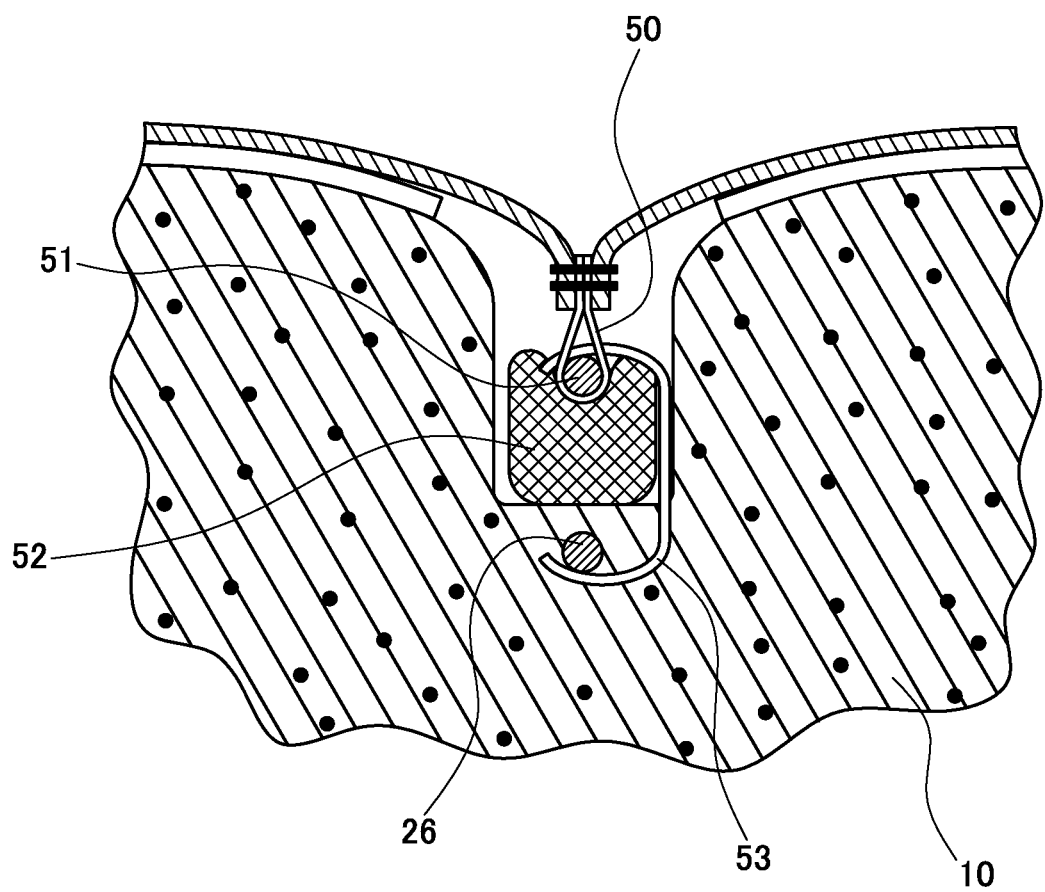
FIG. 9 is an illustrated cross-sectional view of the B-B section of the cushion pad of FIG. 2 showing the third embodiment of the present invention viewed from the side.
Figure 10:
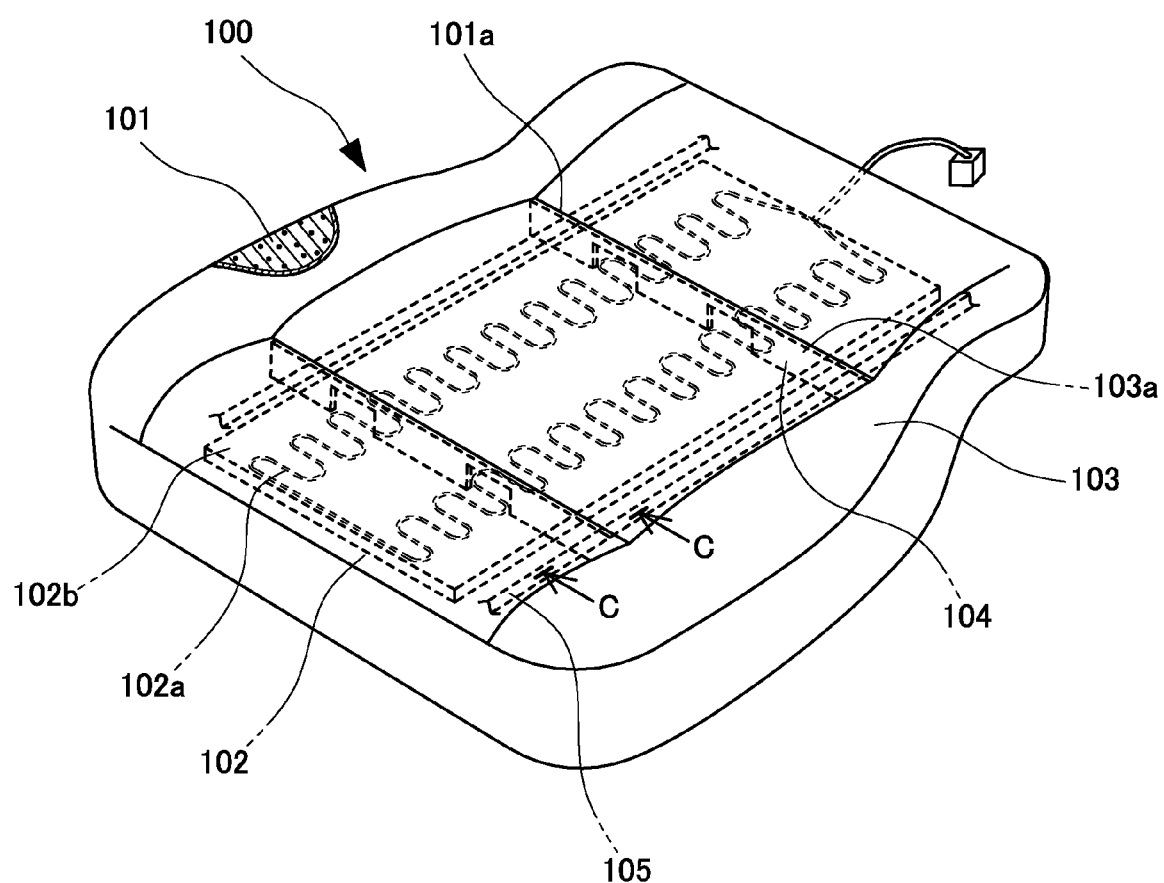
FIG. 10 is an illustration diagram of a seat cushion with a seat heater of a conventional example.
Figure 11:
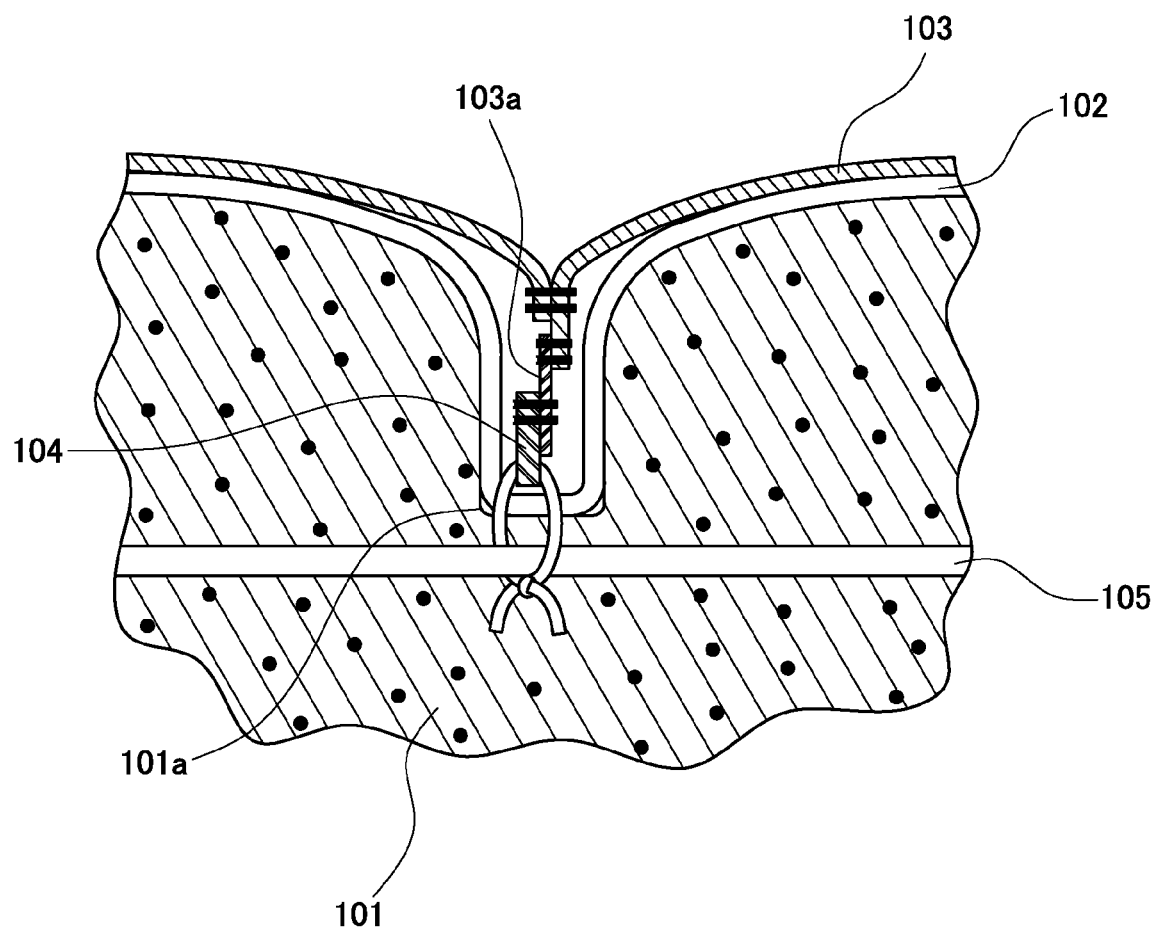
FIG. 11 is a diagram of C-C section of the seat cushion of FIG. 10 viewed from the side.

As shown in FIG. 9, the skin 30 is fixed to the cushion pad 10 by hooking the hanging wire 51 connected to the skin 30b to the insert wire 26 embedded in the cushion pad 10 through a C-ring 53.

Then, the load applied to the cushion pad by seating of the occupant is different in the front to back direction depending on the seating position of the occupant or the constitution of the seat cushion frame.

As shown in FIG. 2, the cushion pad 10 of the present embodiment is composed of the front pad 10a, the center pad 10b and the rear pad 10c, the center pad 10b is subjected to the maximum load by seating of the occupant, the front pad 10a is subsequently subjected to the load, and the rear pad 10c is subjected to the minimum load.

In consideration of the load to which the cushion pad 10 is subjected when the occupant is seated, in the deformation amount of the cushion pad 10, the deformation amount of the center pad 10b is the largest, the deformation amount of the front pad 10a is the second largest, and the deformation amount of the rear pad 10c is the smallest.

Accordingly, it is desirable that at least the corner of the groove 20 on the pad side whose deformation amount is large among the front pad 10a, the center pad 10b and the rear pad 10c is chamfered into an R-shape and the escape portion 24 shown in FIG. 4A is provided.

The relationship between the corner on the pad side whose deformation amount is large and the corner on the pad side whose deformation amount is small corresponds to the relationship between the first corner and the second corner of embodiments.

As thus configured, on the pad side whose deformation amount is large, the R-shaped chamfered corner can increase the cross-sectional area of the groove portion heater wire 43 where a compressive force applied to the groove 20 is received, and the escape portion 24 can suppress the deformation amount of the cushion pad 10, thereby suppressing subsequent deformation of the groove portion heater wire 43 provided in the groove 20.

Moreover, of the groove 20, in the portion where the groove portion heater wire 43 extends into the groove 20, it is desirable that the groove portion heater wire 43 extends to be inclined to the right and left outer sides with respect to the depth direction of the groove 20 toward the groove bottom 25 beyond the corner, at least with respect to the pad side whose deformation amount is large.

As thus configured, on the pad side whose deformation amount is large, the cross-sectional area of the groove portion heater wire 43 where a compressive force applied to the groove 20 is received can be increased, and deformation of the groove portion heater wire 43 provided in the groove 20 can be further suppressed.

Further, in the present embodiment, the groove portion heater wire 43 includes the folded portion 46 folded in almost the center of the front to back width direction of the groove bottom 25, but the present embodiment is not limited thereto, and the arrangement of the folded portion 46 may be appropriately changed in the groove bottom 25.

For example, in consideration of the load to which the cushion pad 10 is subjected when the occupant is seated, the folded portion 46 may be arranged closer to the pad side whose deformation amount is small than almost the center of the groove bottom 25 in the front to back direction.

Moreover, by calculating the deformation width to deform the groove 20 in the compressed direction by the cushion pad 10, the folded portion 46 may be arranged on the central position, offset to the pad side whose deformation width is small, of the groove bottom 25, in the groove 20 after deformation of the pad.

As thus configured, on the pad side whose deformation amount is large, the deformation amount of the cushion pad with respect to a compressive force applied to the groove 20 can be suppressed, and deformation of the groove portion heater wire 43 provided in the groove 20 can be further suppressed.

Then, in the cushion pad of the seat cushion, the softness of the cushion pad is usually changed in the front to back direction in consideration of comfort at the time of seating of the occupant.

In the case of the cushion pad 10 of the present embodiment, the front pad 10a is set to be softer than the center pad 10b and the rear pad 10c.

In consideration of the softness of the cushion pad 10, in the deformation amount of the cushion pad 10, the deformation amount of the front pad 10a is large, and the deformation amounts of the center pad 10b and the rear pad 10c are small.

Accordingly, it is desirable that at least the corner of the groove 20 on the pad side whose deformation amount is large among the front pad 10a, the center pad 10b and the rear pad 10c is chamfered into an R-shape and the escape portion 24 shown in FIG. 4A is provided.

As thus configured, on the pad side whose deformation amount is large, the R-shaped chamfered corner can increase the cross-sectional area of the groove portion heater wire 43 where a compressive force applied to the groove 20 is received, and the escape portion 24 can suppress the deformation amount of the cushion pad 10, thereby further suppressing subsequent deformation of the groove portion heater wire 43 provided in the groove 20.

Moreover, of the groove 20, in the portion where the groove portion heater wire 43 extends into the groove 20, it is desirable that the groove portion heater wire 43 extends to be inclined to the right and left outer sides with respect to the depth direction of the groove 20 toward the groove bottom 25 beyond the corner, at least with respect to the pad side whose deformation amount is large.

As thus configured, on the pad side whose deformation amount is large, the cross-sectional area of the groove portion heater wire 43 where a compressive force applied to the groove 20 is received can be increased, and deformation of the groove portion heater wire 43 provided in the groove 20 can be further suppressed.

Figure 3:
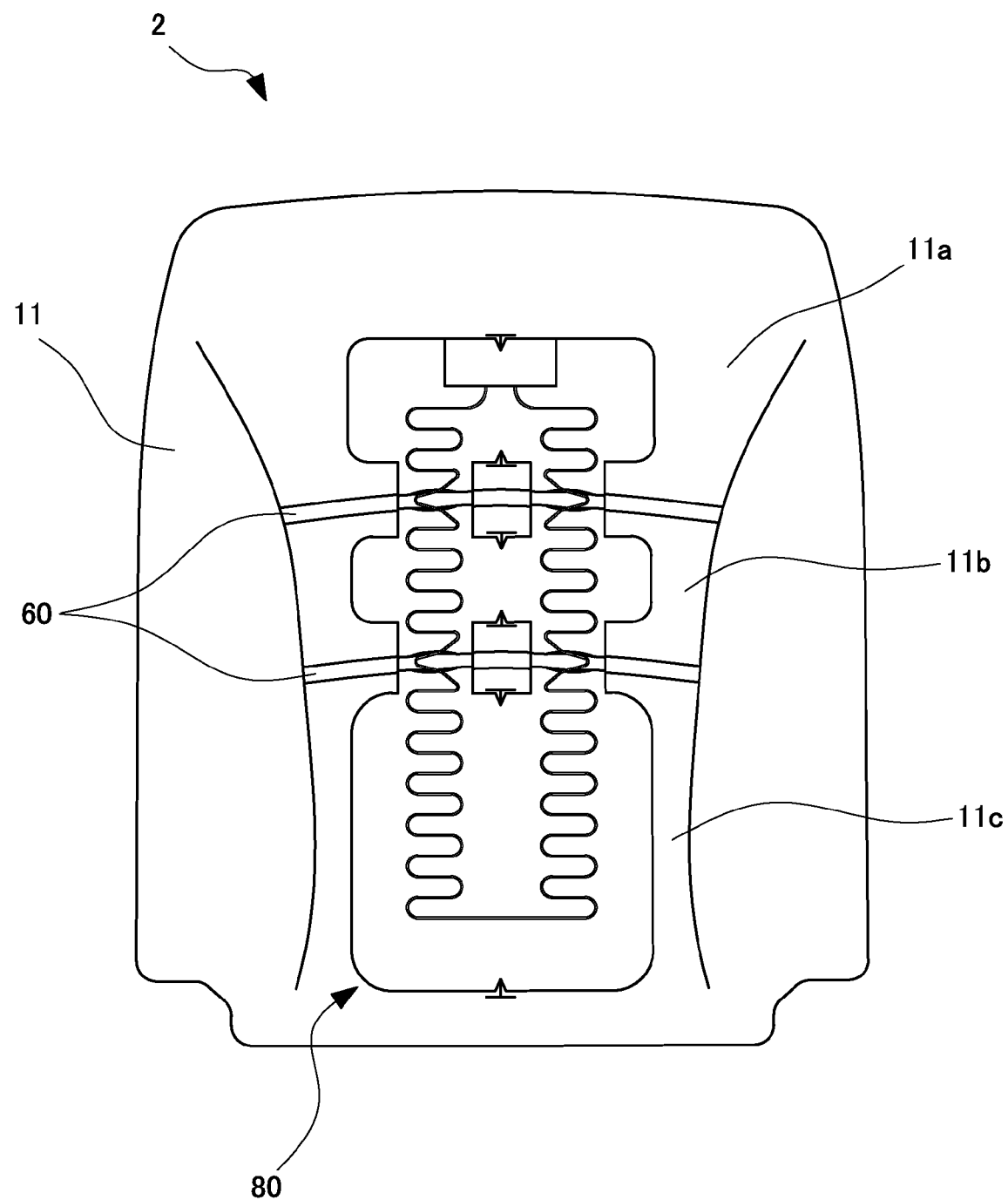
FIG. 3 is a schematic front view of a seat back according to various embodiments of the present invention, showing a state in which the seat heater is placed on the cushion pad.

Next, the configuration in which the seat heater 80 is fixed on the top surface of the cushion pad 11 in the seat back 2, and the cushion pad 11 and the seat heater 80 are covered with the skin 70 will be described. It should be noted that the contents overlapping with the contents described about the seat cushion 1 will be omitted As shown in FIG. 3, the cushion pad 11 is made up of an upper pad 11a located on the upper side, a center pad 11b located on the center side, and a lower pad 11c located on the lower side, of the cushion pad 11. On the top surface of the cushion pad 11, grooves 60 elongated in the right and left direction are formed.

Behind the grooves 60, and further behind the cushion pad 11, as is the case with the seat cushion 1, an S spring (not shown) made of a wave shaped linear member is provided, and the S spring is overlapped with the cushion pad 11 in the front to back direction.

Then, the load applied to the cushion pad by seating of the occupant is different in the up and down direction.

In the case of the cushion pad 11 of the present embodiment, the lower pad 11c is subjected to the maximum load by seating of the occupant, the center pad 11b is subsequently subjected to the load, and the upper pad 11a is subjected to the minimum load.

In consideration of the load to which the cushion pad 10 is subjected when the occupant is seated, in the deformation amount of the cushion pad 11, the deformation amount of the lower pad 11c is the largest, the deformation amount of the center pad 11b is the second largest, and the deformation amount of the upper pad 11a is the smallest.

Accordingly, it is desirable that at least the corner of an opening of the groove 60 on the pad side whose deformation amount is large among the upper pad 11a, the center pad 11b and the lower pad 11c is chamfered into an R-shape and the escape portion is provided.

Moreover, of the groove 60, in the portion where the heater wire fixed to the seat heater 80 extends into the groove 60, it is desirable that the groove portion heater wire extends to be inclined to the right and left outer sides with respect to the depth direction of the groove 60 toward the groove bottom 25 beyond the corner, at least with respect to the pad side whose deformation amount is large.

Then, in the cushion pad of the seat back, the softness of the cushion pad 11 is usually changed in the up and down direction in consideration of comfort at the time of seating of the occupant.

Of the cushion pad 11 of the present embodiment, the upper pad 11a, the center pad 11b and the lower pad 11c are set to have the same softness, or the lower pad 11c is set to be softer than the center pad 11b and the upper pad 11a.

In consideration of the softness of the cushion pad 11, in the deformation amount of the cushion pad 11, the deformation amounts of the whole are the same, or the deformation amount of the lower pad 11c is large and the deformation amounts of the center pad 11b and the upper pad 11a are small.

Accordingly, it is desirable that at least the corner of the opening of the groove 60 on the pad side whose deformation amount is large among the upper pad 11a, the center pad 11b and the lower pad 11c is chamfered into an R-shape and the escape portion is provided.

Moreover, of the groove 60, in the portion where the heater wire fixed to the seat heater 80 extends into the groove 60, it is desirable that the groove portion heater wire 43 extends to be inclined to the right and left outer sides with respect to the depth direction of the groove 60 toward the groove bottom 25 beyond the corner, at least with respect to the pad side whose deformation amount is large.

In the above embodiments, a front seat of the vehicle has been described as a specific example, but the present invention is not limited thereto and can be applied to a middle seat or a rear seat of the vehicle.

REFERENCE NUMERALS

S Vehicle seat
1 Seat cushion
2 Seat back
3 Head rest
10, 11 Cushion pad
   10a Front pad
   10b Center pad
   10c Rear pad
   11a Upper pad
   11b Center pad
   11c Lower pad
20 Groove
21 Opening
22 First corner
23 Second corner
24, 28 Escape portion
25 Groove bottom
26 Insert wire
27 Concave portion
30 Skin
   30a Skin
   30b Skin
   30c Skin
31 Leading-in cloth
32 Hanging member
33 C-ring
40 Seat heater
41 Base material
   41a, 41b, 41c Planar body
   41d Connecting planar body
42 Heater wire
   42a Front heater wire
   42b Center heater wire
   42c Rear heater wire
43 Groove portion heater wire
44 Front groove portion heater wire
45 Rear groove portion heater wire
   46 Folded portion
47 Notch
48 Thermostat
49 Regulation member
50 Leading-in cloth
51 Hanging wire
52 Buffering member
53 C-ring
54 S spring
60 Groove
70 Skin 80 Seat heater
100 Seat cushion
101 Cushion pad
  101a Groove portion
102 Seat heater
  102a Heater wire
  102b Base material
103 Skin
  103a Leading-in cloth
104 Hanging member
105 Insert wire

The invention claimed is:

1. A vehicle seat, comprising:
a cushion pad;
a skin for covering the cushion pad; and
a seat heater between the cushion pad and the skin for covering the cushion pad,
wherein:
a groove is provided on a surface of the cushion pad;
the seat heater comprises:
  a first heater wire and a second heater wire which are arranged on opposite sides to each other through the groove; and
  a groove portion heater wire provided in the groove for connecting the second heater wire with the first heater wire;
the groove comprises:
  a first corner located on a side on which the first heater wire is arranged of both ends of an opening of the groove; and
  a second corner located on a side on which the second heater wire is arranged;
the groove portion heater wire comprises:
  a first end portion extending toward a bottom of the groove beyond the first corner;
  a second end portion extending toward a bottom of the groove beyond the second corner; and
  a folded portion folded in an extending direction of the groove at the bottom of the groove;
the folded portion is arranged in a central part of the groove in a direction of connecting the first heater wire with the second heater wire; and
the extending direction of at least one of the first end portion and the second end portion of the groove portion heater wire is inclined with respect to a depth direction of the groove.

2. The vehicle seat according to claim 1, wherein:
a region where the first heater wire is placed is located at a side where a deformation amount of the cushion pad with respect to a load applied to the cushion pad by seating of an occupant is larger than a region where the second heater wire is placed, of a surface of the cushion pad; and
the extending direction of the first end portion of the groove portion heater wire is inclined with respect to the depth direction of the groove.

3. The vehicle seat according to claim 1, wherein the first corner and the second corner are chamfered into an R-shape.

4. The vehicle seat according to claim 1, wherein the groove portion heater wire comprises one folded portion.

5. The vehicle seat according to claim 1, wherein:
a positioning portion for arranging the seat heater on the cushion pad is provided on at least either one of the cushion pad and the seat heater, and
the positioning portion positions the seat heater at a position where the groove portion heater wire extends toward the bottom of the groove from at least one of the corners to be inclined than the depth direction of the groove beyond the corner.

6. The vehicle seat according to claim 5, wherein:
the positioning portion comprises a concave portion provided on the surface of the cushion pad and a notch formed by notching a part of the seat heater, and
when the seat heater is arranged on the cushion pad, the position where the notch is provided is aligned with the position where the concave portion is provided.

7. The vehicle seat according to claim 5, wherein:
the positioning portion comprises a convex portion provided on the surface of the cushion pad and a notch formed by notching a part of the seat heater; and
when the seat heater is arranged on the cushion pad, the position where the notch is provided is aligned with the position where the convex portion is provided, and the notch is abutted to the convex portion.

8. The vehicle seat according to claim 1, wherein:
the heater wire comprising the first heater wire, the second heater wire and the groove portion heater wire extends to intersect with the groove;
the groove comprises a first region where the groove portion heater wire extends and a second region different from the first region; and
the first region comprises an escape portion in which the length along the extending direction of the heater wire at the opening is longer than the second region.

9. The vehicle seat according to claim 8, wherein the escape portion widens in a tapered shape from the bottom toward the opening of the groove.

10. The vehicle seat according to claim 8, wherein
the escape portion comprises concave portions arranged on opposite sides to each other through the groove, and
the concave portion are recessed in the bottom direction of the groove and are shallower than the depth of the groove.

11. The vehicle seat according to claim 1, wherein the groove comprises a regulation member in a region different from a region where the groove portion heater wire extends in the extending direction of the groove.

12. The vehicle seat according to claim 11, wherein:
a hanging member inserted into the groove is attached to the skin; and
the regulation member is attached to the skin together with the hanging member.

* * * * *